Dec. 9, 1930.  P. GRABLER  1,784,005

SHOCK ABSORBER

Filed July 23, 1927

Inventor
Peter Grabler

By C. F. Heinkel,
Attorney

Patented Dec. 9, 1930

1,784,005

UNITED STATES PATENT OFFICE

PETER GRABLER, OF ROCKY RIVER, OHIO, ASSIGNOR TO GRABLER STABILIZER CO., OF CLEVELAND, OHIO

SHOCK ABSORBER

Application filed July 23, 1927. Serial No. 207,913.

My invention relates to devices commonly called or known as shock absorbers and intended to be associated with a spring to stabilize a device supported by or on the spring.

The main object of my invention is to provide a simple and inexpensive means of shock absorber proclivities which can be made as a unit independent of a spring, which can be attached to and anchored on a spring without changing the structure of the spring, which may or may not have resiliency therein, and in which the tension or resiliency can be adjusted to vary the strength of the resiliency mentioned. Other objects will appear, or become obvious or apparent, or will suggest themselves during the description of the devices shown in the accompanying drawing.

In many instances, such as in auto vehicles for instance, a body is supported on one or more springs which are interposed between the body and another element of a device as the axles and the wheels of vehicles for instance. When such a device moves over uneven ground, the wheels or the axles or both change their vertical positions or relations and are cushioned by the spring to relieve the body of sudden jars but this spring action causes a sort of up and down swaying motion in the body which is quite inconvenient to occupants of the body.

My invention aims to eliminate such swaying motions as far as possible and to retain the body as steady as possible without destroying the office of springs or materially diminish that office.

In many instances, springs have spring clips thereon. My invention aims to leave these clips in their proper positions and to provide a means whereby the clip can remain in position and other parts of the device can be shifted or placed into different positions to clear the clip so that no part or portion of a spring needs to be changed or altered in any manner when the device is attached thereto.

In order to illustrate my invention, I have embodied the same in one form in a certain device shown in the accompanying drawing; I am aware, however, that my invention can be embodied in forms and devices other than the one so shown.

In the accompanying drawing:—

Similar reference characters refer to similar parts throughout the views.

Figure 1:
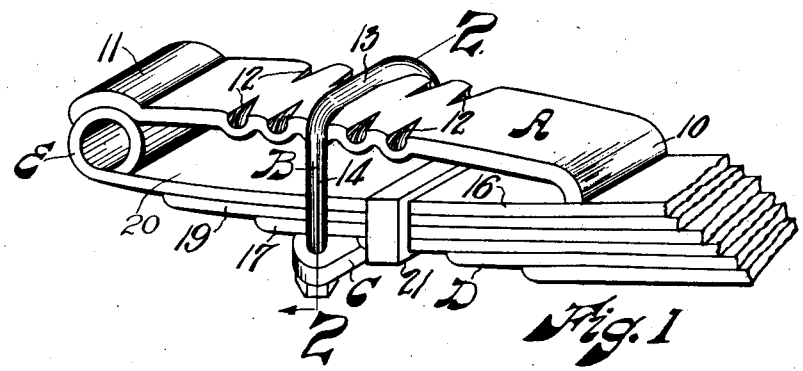
Fig. 1 is a perspective view of a device embodying the features of my invention.

The device shown in the accompanying drawing comprises, principally, the body or plate element or member A, the U bolt B, and the clamp plate C; all associated with the leaf spring D having the eye E.

In the device shown in the drawing, the member A is made of spring steel and is resilient but this member can be made unresilient when so desired.

The member A has the toe 10 on one end thereof and the curved portion 11 on the other end thereof. When the device is attached to the spring D, the toe rests on the top leaf of the spring and the curved portion rests on the eye E of the spring. Said curved portion is preferably in the form of an upwardly offset portion, the under-surface of which is concaved so that it will conform to the contour and rest upon the top of the eye of said spring. The body portion of the member A is spaced from the spring and has, in this particular instance, the depressions 12 to anchor the U bolt B to prevent lateral movement thereof.

Figure 2:
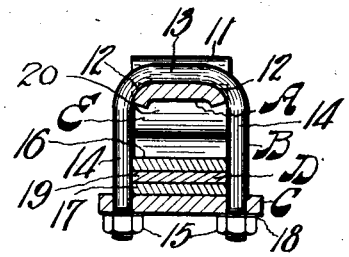
Fig. 2 is a transverse section taken in a vertical plane indicated by the line 2—2 in Fig. 1 and shows more clearly one manner of forming and of associating the elements.

In this particular structure, the depressions 12, five on each edge of the plate in this instance, are formed by bending some of the material of the plate curvedly downward on each edge of the plate as is more clearly shown in Fig. 2.

The U bolt B has the body portion 13 and the legs 14 with the nuts 15 threaded thereon. The juncture of the body portion and the legs is rounded in conformity to the downward curvature of the depressions 12. The one U bolt fits into either two of the opposite depressions since all of the depressions are of the same form.

The clamp plate C has two holes through the same, corresponding to the spacing of the legs 14.

The device shown and described can be installed on the spring D by placing the member A onto the top of the leaf 16 with the toe 10 resting on the top of the leaf 16 and the curved portion 11 resting on the top of the eye E; then placing the U bolt over the spring with the portions 13 thereof in two opposite ones of the depressions 12 and the legs 14 thereof extending downwardly over the sides of the spring; then telescope the plate C over the legs 14 to abut the underside of the leaf 17 of the spring; then place the nut locks 18 onto the legs; and then screw the nuts 15 onto the legs until the plate C contacts the underside of the leaf 17 and the toe contacts the top of the leaf 16 and the portion 11 contacts the eye E. The portion 11 anchors or localizes the member A on the spring and the U bolt, itself anchored or localized in two of the depressions 12 and by the sides of the spring, retains the member A in position on the spring. This arrangement contacts the free ends of the leaves 16, 17 and 19 on each other with the space 20 between the top of the leaf 16 and the member A.

By manipulation of the nuts 15, the tension of the member A can be increased or decreased as desired and to any desired degree.

When the device shown and described is attached to the spring as described and the tension thereof is adjusted as described, and when the spring carrying element moves over uneven ground, the spring permits this element to follow the uneven ground but the device described does not permit the uneven movement of this element to move the body correspondingly since the spring has resiliency in itself and the outer portions of the leaves of the spring under the device are limited in their individual actions by the device and are tied to the device and thereby prevent the objectionable or inconvenient up and down swaying of the body carried by the spring. The advantage of this arrangement is that instead of the bending strains being directly applied to the top of the leaf spring contiguous to the eye, said strains are first applied to the eye and from thence carried around into the body of the spring. In this way, the member A not only absorbs the shocks, but also very materially reenforces the spring itself.

The U bolt can be placed into any two opposite ones of the depressions 12 to clear the spring clips 21 in case the same is not in the position shown in Fig. 1 and thereby permits the device to be used on variously constructed springs without any structural change in the spring.

Figure 3:
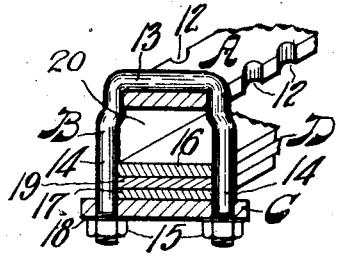
Fig. 3 is a section similar to Fig. 2 and shows another manner of forming and of associating the elements.

In Fig. 3, the depressions 12 are cut into the side edges of the plate A. In this instance, with a plate A as wide as the spring, the inner ends of the legs 14 are offset to enter the depressions 12 while the outer ends thereof are spaced far enough apart to clear the side edges of the leaves of the spring and to permit the curved portion 11 to pass through between the spring shackles.

Figure 4:
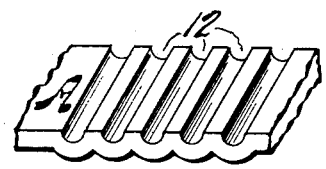
Fig. 4 is a perspective view of a portion of the plate of the device and shows another manner of forming the plate to effect a retaining means for the U bolts.

In Fig. 4, the depressions 12 extend of even depth all the way across the plate A.

Other means may be used to retain the U bolt in position laterally; clamp means other than the U bolt and clamp plate shown and described my be used.

I am aware that changes can be made in the structure as well as in the arrangement of the elements shown and described and that my invention is applicable to devices other than the one shown and described within the scope of the appended claims; therefore, without limiting myself to the precise structure and arrangement of elements as shown and described nor to the particular application of my invention as shown and described.

I claim:—

1. A shock absorber of the character described comprising a body member having an upwardly offset portion at one end, the under surface of which is concaved to fit over and rest upon the top portion of the eye of a leaf spring so that the strains are directly applied to said eye, the other end of said body member being provided with a toe positioned to engage the top surface of said spring so that when said body member is in position on said spring it is maintained in spaced relation with respect to said spring, and means for retaining said body member in position.

2. A shock absorber of the character described comprising a flat body member of resilient material having one end provided with a rigid upwardly offset portion the under surface of which is concaved to fit over the top portion of the eye of a leaf spring, while the said body member is in operative position on said spring, so that the strains are directly applied to said eye, the other extremity of said body member being downwardly curved to engage the top surface of said spring so that the major portion of said body member is held in spaced relation with respect to said spring, and means for retaining said body member in position.

3. A shock absorber of the character described comprising a body member having one end provided with a rigid upwardly offset portion the under surface of which is concaved to fit over the top portion of the eye of a leaf spring, while the said body member is in operative position on said spring, so that the strains are directly applied to said eye, the other end of said body being provided with a toe positioned to engage the top surface of said spring so as to maintain said body member in spaced relation with respect to said spring, and a clamping member shaped to engage said body member at a position between the ends thereof and having means to engage said spring so as to retain said body member in position.

4. A shock absorber of the character described comprising a body member having one end provided with a rigid upwardly offset portion the under surface of which is concaved to fit over the top portion of the eye of a leaf spring, while the said body member is in operative position on said spring, so that the strains are directly applied to said eye, said member having its other end provided with a curved toe shaped to engage the top surface of a leaf spring, said toe cooperating with the said upwardly offset end while it is engaged with the eye of the spring to maintain said body member in spaced relation with respect to said spring, and anchoring means cooperating with said curved end to retain said body member in position.

5. A shock absorber of the character described comprising a body member having one end provided with a rigid upwardly offset portion the under surface of which is concaved to fit over the top portion of the eye of a leaf spring, while the said body member is in operative position on said spring, so that the strains are directly applied to said eye, said member having its other end provided with a curved toe shaped to engage the top surface of a leaf spring, said toe cooperating with the offset curved portion while engaged with said eye, to maintain said body member in spaced relation with respect to said spring, a U bolt shaped to extend over said body member, and a clamping plate cooperating with said bolt.

6. A shock absorber of the character described comprising a body member having one end provided with a rigid upwardly offset portion the under surface of which is concaved to fit over the top portion of the eye of a leaf spring, while the said body member is in operative position on said spring, so that the strains are directly applied to said eye, said member having its other extremity curved downwardly to provide a toe positioned to engage the top surface of the spring, said toe cooperating with the offset curved portion while engaged with said eye, to maintain said body member in spaced relation with respect to said spring, and anchoring means shaped to engage both the body member and the spring, said body member being provided with means for preventing lateral movement of said anchoring means.

7. A shock absorber of the character described comprising an absorber member having one end provided with a rigid upwardly offset portion of the under surface of which is concaved to fit over the top portion of the eye of a leaf spring, while the said body member is in operative position on said spring, so that the strains are directly applied to said eye, the other end of said body member being provided with a toe positioned to engage the top surface of the spring and cooperating with the offset curved portion while engaged with the eye of the spring to maintain said absorber member in spaced relation with the spring, and anchoring means for said body member, said anchoring means cooperating with said curved end to prevent longitudinal movement of said absorber member with respect to the spring.

8. In a shock absorber, the combination with a leaf spring having an eye at one end, of an absorber member having one end provided with a rigid upwardly offset portion the under surface of which is curved to fit over the top portion of the eye of said spring, the other extremity of said absorber member being downwardly curved to engage the top surface of said spring so that the portion of said absorber member extending between said offset portion and said downwardly curved portion is held in spaced relation with respect to said spring, and tension means cooperating with said offset end to retain said absorber body in position on said spring.

9. In a shock absorber, the combination with a leaf spring having an eye at one end thereof, of an absorber member having means engaging the top portion of the eye of said spring, a clamp shaped to engage both the spring and the absorber member, and means cooperating with said clamp to prevent endwise movement of the absorber member in one direction, movement in the other direction being prevented by the complemental engaging portions of said absorber member and said eye.

10. The combination with a leaf spring having an eye, of a shock absorber member having one surface at one extremity provided with a concaved portion shaped to fit over the top portion of said eye and a toe at the other end positioned to cooperate with said eye to maintain the absorber member in spaced relation with said spring, and means for varying the distance between said absorber member and the spring so as to vary the tension on said absorber member.

11. A shock absorber including an element attachable to and removable from a spring in the direction of the action of the spring and having means on one end thereof co-operative with a portion of the spring to localize itself on the spring, and clamp-like means over a portion of said element and over a portion of the spring to retain said element in desired relation to the spring.

12. A shock absorber including an element attachable to and removable from a spring in the direction of the action of the spring and having means on one end thereof co-operative with a portion of the spring to localize and longitudinally confine itself on the spring, and clamp-like means over a portion of said element and over a portion of the spring to retain said element in desired relation to the spring.

13. A shock absorber for a spring having an eye including an element attachable to and removable from the spring in the direction of the action of the spring and having means on one end thereof co-operative with a portion of the eye to localize itself on the spring, and clamp-like means over a portion of said element and over a portion of the spring to retain said element in desired relation to the spring.

14. A shock absorber for a spring having an eye including an element attachable to and removable from the spring in the direction of the action of the spring and having one end thereof co-operative with a portion of the eye to localize itself on the spring, the other end thereof contactable on the spring, the portion thereof intermediate said ends spaced from the spring, and clamp-like means over a portion of said element and over a portion of the spring to retain said element in desired relation to the spring.

15. A shock absorber for a spring including an element attachable to and removable from the spring in the direction of the action of the spring and having means on one end thereof co-operative with a portion of the spring to localize itself on the spring, clamp-like means over a portion of said element and over a portion of the spring to retain said element in desired relation to the spring, and means to retain said clamp-like means in various positions longitudinally of said element.

16. A shock absorber for a spring having an eye including an element attachable to and removable from the spring in the direction of the action of the spring and having one end thereof co-operative with a portion of the eye to localize itself on the spring, the other end thereof contactable on the spring, the portion thereof intermediate said ends spaced from the spring, clamp-like means over a portion of said element and over a portion of the spring to retain said element in desired relation to the spring, and means to retain said clamp-like means in various positions longitudinally of the spring.

17. In combination, a leaf spring having an eye, a shock absorber member contacting with the top of said eye and having means by which it is retained against movement relative to said eye in either direction longitudinally of said spring, a toe means movable on the spring to space said member from said spring, and a clamp means located between said eye and said toe means to hold said member to said spring.

18. In combination, a leaf spring having an eye, a shock absorber member having one end extended over and contacting with said eye and its other end provided with a toe contacting with said spring and free to move relative thereto, so that said shock absorber member is spaced from said spring, said absorber member having means by which it is retained against movement with respect to said eye and in either direction longitudinally of said spring, and a clamp means located between said eye and said toe means to hold said absorber member to said spring.

19. A shock absorber for a leaf spring including a member having one end thereof adapted to engage a portion of the spring to localize the member on the spring and retaining means for holding said member in relation to the spring.

20. A shock absorber for a spring having an eye including a member having one end thereof adapted to engage the eye of the spring to localize the member on the spring and retaining means for holding said member in relation to the spring.

21. A shock absorber for a spring including a member having one end thereof adapted to engage a portion of the spring to localize the member on the spring and a toe on the other end thereof to contact the spring and to space the middle portion of the member from the spring and retaining means for holding said member in relation to the spring.

22. A shock absorber for a spring including a member having one end thereof adapted to engage a portion of the spring to localize the member on the spring and a toe on the other end thereof to contact the spring and to space the middle portion of the member from the spring and a clamping means for retaining said member in relation to the spring.

23. A shock absorber for a spring including a member having means on each end thereof to contact the spring, one of said ends being adapted to localize said member on the spring, and retaining means for holding said member in relation to the spring.

24. A shock absorber for a spring including a member having means on each end thereof to contact the spring, one of said ends being adapted to localize said member on the spring, and a clamp means intermediate said ends for holding said member onto the spring and in desired relation to the same.

25. A shock absorber for a spring including a member having means on each end thereof to contact the spring, one of said ends being adapted to localize said member on the spring, a clamp means intermediate said ends for holding said member onto the spring and in desired relation to the same, and a retaining means for holding said clamp means in position.

26. A snubber for use with multiple leaf springs of the semielliptical type and which have a master leaf provided at its ends with eyes for the reception of shackle bolts, said snubber consisting of an arched spring having one end provided with a transversely curved portion whose concave side is on the concave side of the spring, the transversely curved portion being adapted to rest on an eye of the master leaf, while the other end rests on the master leaf near its center, the arched spring having means near its center for the reception of a clamping device.

In testimony of the foregoing I affix my signature.

PETER GRABLER.